US012659910B2

(12) United States Patent
Guo et al.

(10) Patent No.: US 12,659,910 B2
(45) Date of Patent: Jun. 16, 2026

(54) SUPPORT OF LOW POWER HIGH ACCURACY POSITIONING (LPHAP)

(71) Applicant: Intel Corporation, Santa Clara, CA (US)

(72) Inventors: Yi Guo, Shanghai (CN); Ansab Ali, Beaverton, OR (US); Sudeep Palat, Cheltenham (GB); Youn Hyoung Heo, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/362,253

(22) Filed: Jul. 31, 2023

(65) Prior Publication Data

US 2024/0023053 A1     Jan. 18, 2024

Related U.S. Application Data

(60) Provisional application No. 63/394,165, filed on Aug. 1, 2022.

(51) Int. Cl.
H04L 1/00       (2006.01)
H04L 5/00       (2006.01)
H04W 64/00     (2009.01)
(52) U.S. Cl.
CPC ........... H04W 64/00 (2013.01); H04L 5/0051 (2013.01)
(58) Field of Classification Search
USPC ....................................................... 455/456.1
See application file for complete search history.

(56) References Cited

U.S. PATENT DOCUMENTS

2025/0184950 A1 * 6/2025 Pan ........................ H04L 5/0048

FOREIGN PATENT DOCUMENTS

EP          4503781 A1 * 2/2025 ........... G01S 5/0205

OTHER PUBLICATIONS

3GPP, "Technical Specification Group Services and System Aspects; 5G System (5GS) Location Services (LCS); Stage 2 (Release 17)," 3GPP TS 23.273 V17.5.0 (Jun. 2022), 5G, 107 pages.
3GPP, "Technical Specification Group Radio Access Network; NG-RAN; Xn application protocol (XnAP) (Release 17)," 3GPP TS 38.423 V17.1.0 (Jun. 2022), 5G, 613 pages.
3GPP, "Technical Specification Group TSG RAN; NR; UE RF requirements for Transparent Tx Diversity (TxD); (Release 17)," 3GPP TR 38.837 V17.1.0 (Jun. 2022), 5G, 55 pages.
Intel, "Revised SID on Study on expanded and improved NR positioning," 3GPP TSG RAN Meeting #96, RP-221814 (revision of RP-213588), Agenda Item: 9.2.5, Budapest, Hungary, Jun. 6-9, 2022, 6 pages.

(Continued)

*Primary Examiner* — Tanmay K Shah
(74) *Attorney, Agent, or Firm* — Gray Ice Higdon, PLLC

(57)          ABSTRACT

Various embodiments herein provide techniques for low power, high accuracy positioning (LPHAP) in a wireless cellular network. For example, the techniques may be used for a user equipment (UE) in RRC_INACTIVE and/or RRC_IDLE mode. In some embodiments, the UE may notify the network of a LPHAP requirement and/or capability. This may enable the network (e.g., location management function (LMF) and/or next generation Node B (gNB)) to perform positioning in a power efficient way.

17 Claims, 9 Drawing Sheets

(56)  References Cited

OTHER PUBLICATIONS

3GPP, "Technical Specification Group Services and System Aspects; Service requirements for cyber-physical control applications in vertical domains; Stage 1 (Release 18)," 3GPP TS 22.104 V18.3.0 (Dec. 2021), 5G, 101 pages.
3GPP, "Technical Specification Group Radio Access Network; NR; Radio Resource Control (RRC) protocol specification (Release 17)," 3GPP TS 38.331 V17.1.0 (Jun. 2022), 5G, 1273 pages.
3GPP, "Technical Specification Group Radio Access Network; LTE Positioning Protocol (LPP) (Release 17)," 3GPP TS 37.355 V17.1.0 (Jun. 2022), 5G, 345 pages.

* cited by examiner

Figure 2

800 sending, to a network entity, an indication of the LPHAP
requirement or capability
802 performing a positioning procedure in accordance with the
LPHAP requirement or capability while the UE is in an
RRC_IDLE state or an RRC_INACTIVE state
804 reporting a result of the positioning procedure
806

900 receiving an indication of a low power high accuracy
positioning (LPHAP) requirement or capability of a UE
902 configuring, based on the indication, resources for the UE to
use for a positioning procedure when the UE is in an
RRC_IDLE state or an RRC_INACTIVE state
904

SUPPORT OF LOW POWER HIGH ACCURACY POSITIONING (LPHAP)

CROSS REFERENCE TO RELATED APPLICATION

The present application claims priority to U.S. Provisional Patent Application No. 63/394,165, which was filed Aug. 1, 2022; the disclosure of which is hereby incorporated by reference.

FIELD

Various embodiments generally may relate to the field of wireless communications. For example, some embodiments may relate to techniques for low power, high accuracy positioning (LPHAP).

BACKGROUND

With Third Generation Partnership Project (3GPP) Release (Rel)-17, the user equipment (UE) efficiency (power saving) of positioning is improved by specifying the positioning for UEs in radio resource control (RRC) inactive (RRC_INACTIVE) state. All New Radio (NR) positioning methods (such as NR downlink (DL)-time difference of arrival (TDOA), uplink (UL)-TDOA, and Multi-round trip time (RTT), etc.) and radio access technology (RAT)-independent positioning methods (such as global navigation satellite system (GNSS), wireless local area network (WLAN), etc.) and all corresponding positioning measurements can be supported for UEs in RRC_INACTIVE state. However, the existing specifications do not optimize the support of positioning in RRC_INACTIVE and/or RRC_IDLE state.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 illustrates a procedure for low power, high accuracy positioning (LPHAP) when the UE is in RRC_IDLE state, in accordance with various embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide improvements to support for low power, high accuracy positioning (LPHAP). For example, embodiments may include techniques for LPHAP for a user equipment (UE) in RRC_INACTIVE and/or RRC_IDLE mode. In some embodiments, the UE may notify the network of a LPHAP requirement and/or capability. This may enable the location management function (LMF) and/or next generation Node B (gNB) to perform positioning in a power efficient way.

Rel-17: Support for Positioning in RRC_INACTIVE

With Rel-17, the UE efficiency (power saving) of positioning is improved by specifying the positioning for UEs in RRC_INACTIVE state. All NR positioning methods (such as NR DL-TDOA, UL-TDOA and Multi-RTT, etc.) and RAT-independent positioning methods (such as GNSS, wireless local area network, etc.) and all corresponding positioning measurements can be supported for UEs in RRC_INACTIVE state.

To support positioning for a UE in RRC_INACTIVE with the NR positioning methods, the UE is able to perform PRS measurement and SRS transmission in RRC_INACTIVE. In addition, any uplink Location Service (LCS) or LPP message can be transported in RRC_INACTIVE. If the UE initiated data transmission using UL small data transmission (defined in pp (SDT), the network can send DL LCS, LPP and Radio Resource Control (RRC) message (e.g. to configure SRS for UL positioning, if it is supported) to the UE without the need of state transition. The network considers the UE reporting information to help for this purpose. The UE may also obtain the positioning assistance information via broadcasted positioning system information or the information configured when the UE was in RRC_CONNECTED.

Figure 1:
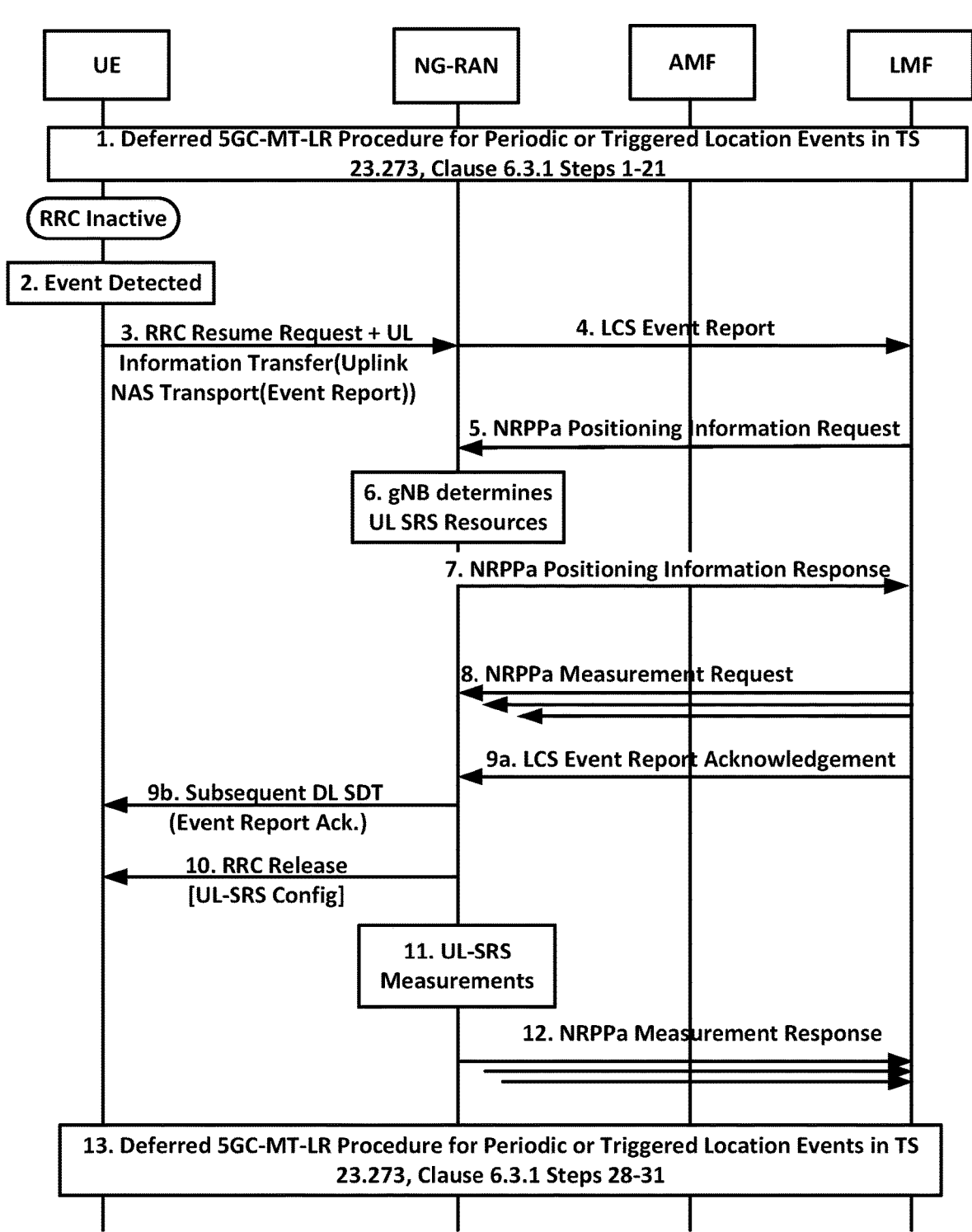
FIG. 1 illustrates a procedure for positioning when the user equipment (UE) is in a RRC_INACTIVE state.

A procedure for positioning in RRC_INACTIVE state is shown in FIG. 1. Aspects of various operations shown in FIG. 1 are described further below.

1. Operations 1-21 for the deferred 5GC-MT-LR specified in TS 23.273, clause 6.3.1 are performed. The UE is released by the last serving gNB from RRC_CONNECTED to RRC_INACTIVE by RRCRelease with SuspendConfig.

3. When an event is detected (or slightly before) the UE sends a UL NAS Transport message along with the RRC Resume Request with SDT.

4. The receiving gNB forwards the message to the serving AMF. The AMF determines the corresponding LMF and forwards the message towards the LMF.

NOTE: If the anchor gNB is not changed from the last serving gNB to the receiving gNB, the LCS event report is forwarded form the receiving gNB to the last serving gNB via XnAP message RRC TRANSFER as in TS 38.423. Subsequent downlink/uplink messages are also forwarded between last serving gNB to the receiving gNB via XnAP message RRC TRANSFER.

5-8. Same as Rel-16, the LMF will request the serving gNB to configure UL SRS configuration to the UE, and forward the configuration to measured gNB;

9. The LMF sends a supplementary services (SS) LCS Event Report Acknowledgement to the UE which is transferred via the serving AMF and the serving gNB. The receiving gNB then provides the SS Event Report Acknowledgement to the UE at Step 9b via Subsequent DL SDT.

10. The receiving gNB sends a RRCRelease message with suspendConfig to keep the UE in RRC_INACTIVE state. The RRCRelease message includes the UL-SRS Configuration.

11. The UE transmits UL-SRS and the gNBs that have received the NRPPa message for measurement request perform the measurements of the UL-SRS transmitted by the UE.

12. After performing the UL-SRS measurements, the gNBs provide the UL measurements to the LMF in a NRPPa Measurement Response message.

However 3GPP did not optimize the support of positioning in RRC_INACTIVE. For example, the LMF is not aware whether a UE is in RRC_INACTIVE or not.

Rel-17: Support for Positioning in RRC_IDLE

The outcome from Rel-17 study item (SI) on RRC_IDLE (captured in 3GPP Technical Standard (TS) 38.837) is:

From a physical layer perspective, it is feasible for a UE to perform DL positioning measurement in RRC_IDLE state.

Note: This does not imply that measurements have to be reported in RRC_IDLE state.

The following procedures are considered as feasible for DL positioning methods in RRC_IDLE:

Reporting of DL-PRS measurement and/or location estimate performed in RRC_IDLE when the UE is in RRC_INACTIVE/RRC_CONNECTED.

NOTE: The following procedures are considered to have already been supported and can be reused for positioning in RRC_IDLE.

On-demand SI request in RRC_IDLE for assistance data delivery by broadcast in RRC_IDLE.

ProvideAssistanceData can be sent in RRC_CONNECTED for DL-PRS configuration used in RRC_IDLE downlink positioning.

RequestLocationInformation can be sent in RRC_CONNECTED for DL-PRS measurement and/or location estimate performed in RRC_IDLE.

That is, the UE could get assistance data via broadcast signalling or preconfiguration in Connected mode.

The UE could perform PRS measurement in IDLE mode.

The UE can report the results (UE based positioning methods) to internal LCS client for MO-LR.

UE assisted, e.g. calculation in the LMF or UL (UL AoA, UL AoD, UL TDOA, Multi-RTT) related positioning cannot be supported; For NI-LR, MT-LR, the network has to move the UE to CONNECTED.

However, for this solution, the UE has to transition to CONNECTED mode to report the results to LMF for UE assisted positioning. The LMF/AMF may not be aware of which positioning session the UE is using since the AMF/LMF do not maintain the UE context when the UE moves to RRC_IDLE.

Rel-18 Requirements

New Rel-18 SID expanded and improved NR positioning has been approved in RP-221814, where one objective is to study the support of LPHAP:

Study the requirements on LPHAP as developed by SA1 and evaluate whether existing RAN functionality can support these power consumption and positioning requirements. Based on the evaluation, and, if found beneficial, study potential enhancements to help address any limitations [RAN2, RAN1]

Study is limited to a single representative use case (use case 6 as defined TS 22.104). The choice of selected use case can be reviewed at the start of the study.

Study is limited to enhancements to RRC_INACTIVE and/or RRC_IDLE state

RAN1 is working on the evaluation on the power consumption for LPHAP requirement:

RAN1 confirmed that use case 6 defined in TS 22.104 is the single representative use case for the study of LPHAP

| Use Case # | Horizontal accuracy | Positioning interval/duty cycle | battery life time/minimum operation time |
|---|---|---|---|
| 1 | 10 m | on request | 24 months |
| 2 | 2 m to 3 m | <4 seconds | >6 months |
| 3 | <1 m | no indication | 1 work shift-8 hours (up to 3 days, 1 month for inventory purposes) |
| 4 | <1 m | 1 second | 6-8 years |
| 5 | <1 m | 5 seconds-15 minutes | 18 months |
| 6 | <1 m | 15 s to 30 s | 6-12 months |
| 7 | 30 cm | 250 ms | 18 months |
| 8 | 30 cm | 1 second | 6-8 years (no strong limitation in battery size) |
| 9 | 10 m | 20 minutes | 12 years (@20 m J/position fix) |

Note: Use case six, Flexible modular assembly area: Tracking of workpiece (indoor and outdoor) in assembly area and warehouse.

Various embodiments herein provide improvements to support for LPHAP. For example, embodiments may include techniques for LPHAP for a UE in RRC_INACTIVE and/or RRC_IDLE mode. In some embodiments, the UE may notify the network of a LPHAP requirement and/or capability. This may enable the LMF and/or gNB to perform positioning in a power efficient way. Aspects of various embodiments are described further below.

Support LPHAP for UEs in RRC_IDLE Mode

As discussed above, in the existing solutions, the UE has to move to RRC_INACTIVE or RRC_CONNECTED mode in order to report the results which will increase the power consumption. In addition, the existing solutions do not work even if a UE is willing to report results in RRC_INACTIVE or RRC_CONNECTED since the AMF/LMF has no idea what positioning session the UE is using.

Embodiments herein provide techniques to support the reporting when a UE is in RRC_IDLE with or without state transition. For example, for positioning in RRC_IDLE, to support positioning in RRC_IDLE with or without state transition:

The CN is made aware of UE's LPHAP requirement/ capability before triggering this positioning (based on UE's registration or capability (AS capability, LPP capability) stored in CN).

Paging based NI-LR, MT-LR trigger; The AMF/LMF indicates the triggering of NI-LR, MT-LR for IDLE mode UE via paging or MT-SDT, and could indicate the required positioning methods, and/or corresponding resources, positioning ID (see Note 1)

The UE in RRC_IDLE will perform the positioning without the state transition,

The network may provide multiple sets of assistance data together with assistance data set ID via broadcast signalling or dedicated signalling.

For DL, the UE obtains assistance data or multiple assistance data groups from broadcast signalling or preconfigured via dedicated signalling. The LMF/AMF may indicate the selected assistance data group ID in paging, and the UE shall use the assistance data group indicated by the network if available for the positioning procedure, otherwise the UE selects the proper one.

For UL, the UE obtains the UL reference signal configuration or multiple UL reference signal configuration groups via broadcast signalling or dedicated signalling. The LMF/ AMF may indicate the selected assistance data group ID in paging, and the UE shall use the assistance data group indicated by the network if available for the positioning procedure, otherwise the UE selects the proper one.

The UE/AMF/LMF should maintain a positioning ID used for the positioning in RRC_IDLE; AMF/LMF should maintain UE context when positioning is performed during the RRC_IDLE.

Note 1: Positioning ID is used by UE and network to identify the positioning context for the UE.

The UE reports the results to the network indicating the allocated positioning ID together with the results (this can be done via move to connected mode, SDT, etc)

Embodiments may enable to meet power consumption requirement for LPHAP type devices.

Figure 2:
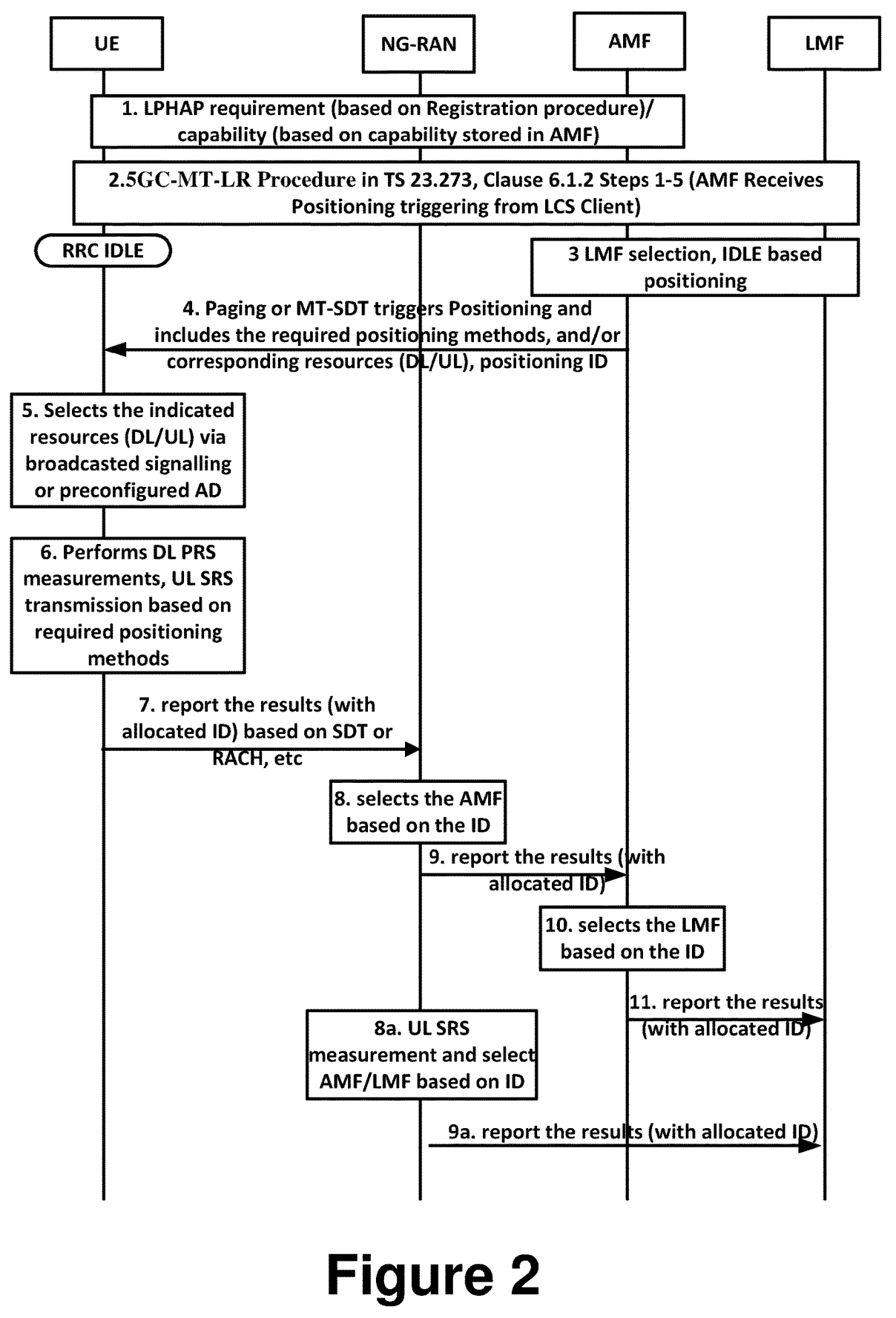

FIG. 2 illustrates an example procedure to support positioning in RRC_IDLE without state transition, in accordance with various embodiments. Aspects of the procedure of FIG. 2 are described further below.

1. The UE reports its LPHAP requirement via registration procedure, or capability reporting and stored in the AMF (e.g. AS capability, LPP capability, NAS capability), or based on subscription;

2. The AMF receives the positioning triggering from LCS client as described in TS23.273;

3. Based on UE's LPHAP requirement and UE's LPHAP capability, the AMF and LMF decide to perform positioning in RRC_IDLE; The AMF/LMF maintain UE context when the UE is performing positioning in RRC_IDLE. If the UE was in RRC_CONNECTED, the network will move the UE to RRC_IDLE, but maintain the UE's positioning context.

4. The AMF triggers positioning procedure using paging or MT-SDT. The message could indicate:
the required positioning methods, and/or
corresponding resources (DL and/or UL) or corresponding resources (DL and/or UL) group ID, and/or
positioning ID (used to identify the session (UE, LMF and AMF) in the whole procedure).

5. The UE in RRC_IDLE performs the positioning.

The network may provide multiple groups of assistance data together with assistance data group ID via broadcast signalling or dedicated signalling.

For DL, the UE obtains assistance data or multiple assistance data groups from broadcast signalling or preconfigured via dedicated signalling. The LMF/AMF may indicate the selected assistance data group ID in paging, and the UE shall use the assistance data group indicated by the network if available for the positioning procedure, otherwise the UE selects the proper one.

For UL, the UE obtains the UL reference signal configuration or multiple UL reference signal configuration groups via broadcast signalling or dedicated signalling. The LMF/ AMF may indicate the selected assistance data group ID in paging, and the UE shall use the assistance data group indicated by the network if available for the positioning procedure, otherwise the UE selects the proper one.

6. The UE performs DL PRS measurement, and/or UL SRS transmission or other positioning measurement, e.g. GNSS, based on the requested positioning method;

7. The UE reports the result without the state transition by transmitting the message via small data transmission (SDT)(e.g. RACH or any UL transmission); The message includes the allocated positioning ID 8. the RAN selects corresponding AMF based on the positioning ID indicated by the UE;

8a. for UL based positioning, the RAN performs UL SRS measurements;

9. the RAN forward the results with allocated positioning ID to the AMF;

9a. for UL based positioning, the RAN sends the results to the AMF/LMF based on the positioning ID indicated by the UE;

10/11. the AMF finds the corresponding LMF based on the positioning ID and forwards results to the LMF together with positioning ID.

Figure 3:
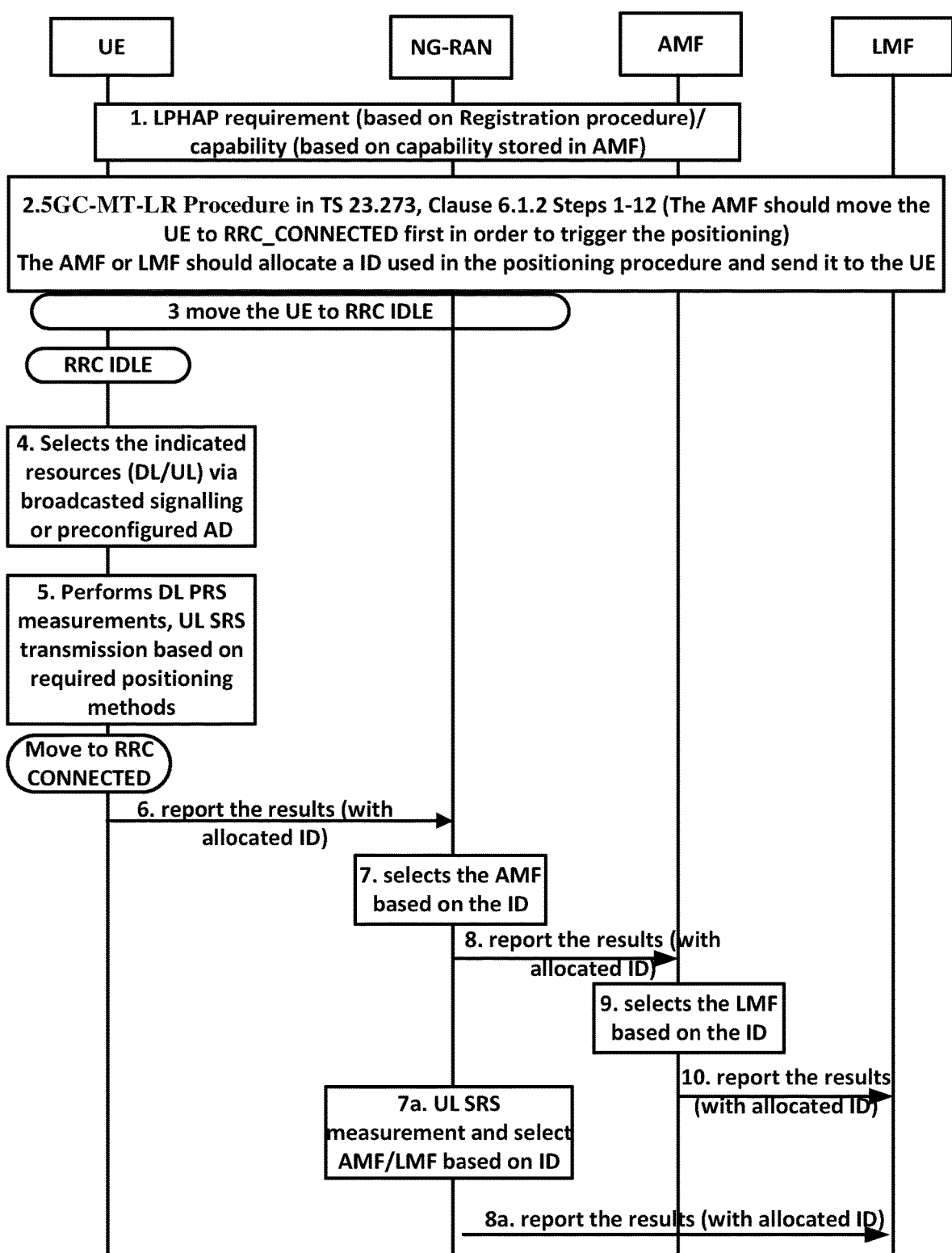
FIG. 3 illustrates another procedure for LPHAP for a UE in RRC_IDLE state, in accordance with various embodiments.

FIG. 3 illustrates another example procedure for positioning in RRC_IDLE, which includes a state transition. Aspects of the procedure of FIG. 3 are described further below.

1. The UE reports its LPHAP requirement via registration procedure, or capability reporting and stored in the AMF, or based on subscription;

2. The AMF receives the positioning triggering from LCS client as described in TS23.273; and moves the UE to RRC_CONNECTED mode.

The AMF/LMF sends necessary information to the UE, including:
the required positioning methods, and/or
corresponding resources (DL and/or UL) or corresponding resources (DL and/or UL) group ID, and/or
positioning ID (used to identify the session (UE, LMF and AMF) in the whole procedure).

3. The UE moves back to RRC_IDLE performs the positioning: The AMF/LMF maintain UE context when the UE is performing positioning in RRC_IDLE.

4. The UE performs DL PRS measurement, and/or UL SRS transmission or other positioning measurement, e.g. GNSS, based on the requested positioning method;

5. The UE reports the result with the state transition. The message includes the allocated positioning ID;

6. the RAN selects corresponding AMF based on the positioning ID indicated by the UE;

7a. for UL based positioning, the RAN performs UL SRS measurements;

8. the RAN forward the results with allocated positioning ID to the AMF;

8a. for UL based positioning, the RAN sends the results to the AMF/LMF based on the positioning ID indicated by the UE;

9/10. the AMF finds the corresponding LMF based on the positioning ID and forwards results to the LMF together with positioning ID;

Support LPHAP for UEs in RRC_INACTIVE Mode.

As discussed above, the LMF/gNB is not aware whether a UE has a low power consumption requirement, and may not select a power efficient way for positioning.

Embodiments herein provide techniques to exchange the LPHAP requirement/capability in order to enable the LMF/gNB to perform positioning in a power efficient way. For example, for positioning in RRC_INACTIVE:

The LPHAP requirement UE includes LPHAP capability in LPP positioning capability or indicate LPHAP requirement during the positioning session, e.g. MO-LR, or assistance data request.

The LMF should select the power saving configuration for the UE, e.g. DL positioning methods only, larger PRS periodicity, narrow PRS bandwidth, etc.

The LMF/UE can also indicate the LPHAP requirements (capability or assistance data) to the gNB in order to let the gNB configure proper SRS/SDT (e.g. larger periodicity of SRS, larger periodicity for paging cycle, etc) for the UE.

Embodiments may enable to meet power consumption requirement for LPHAP type devices.

Figure 4:
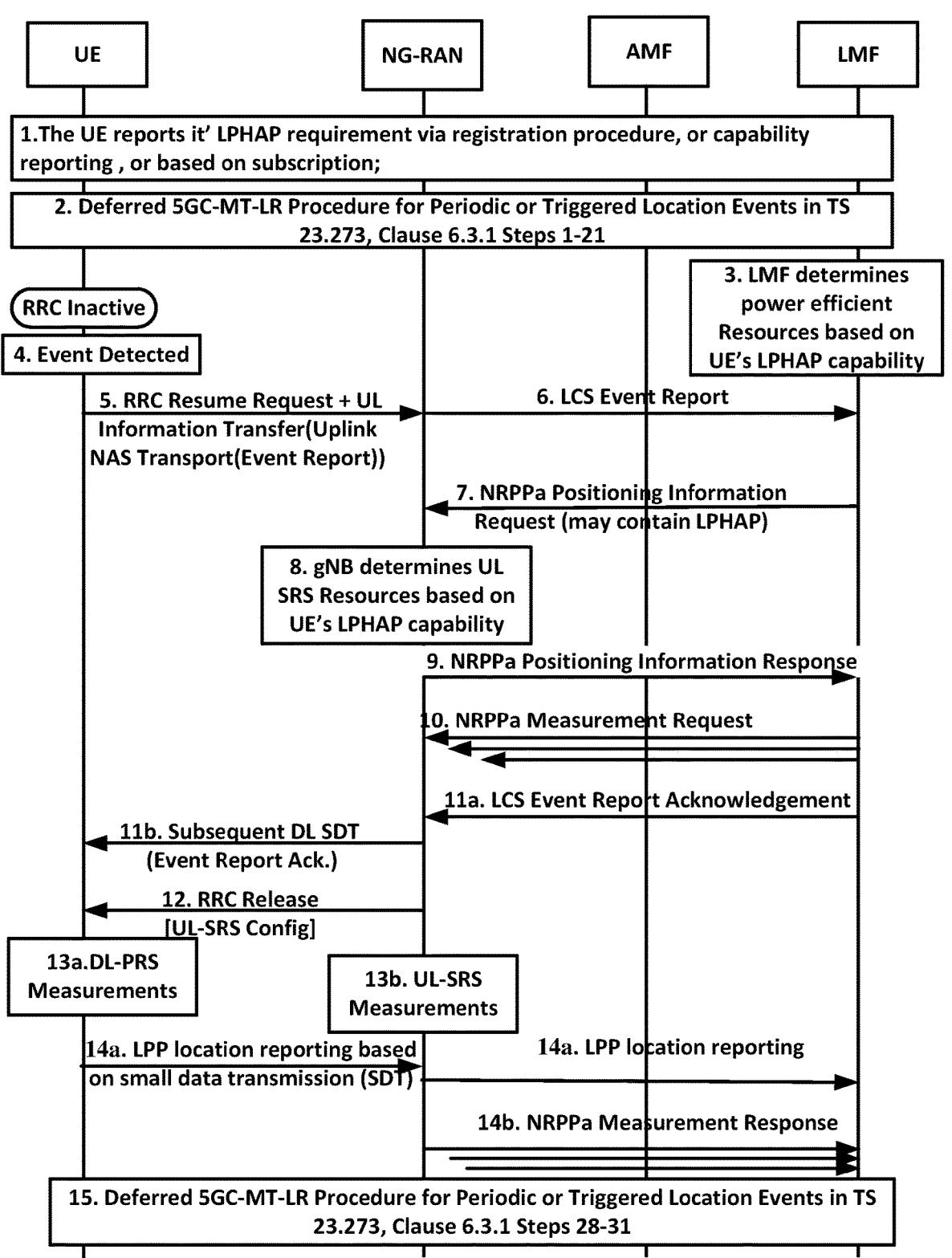
FIG. 4 illustrates a procedure for LPHAP for a UE in RRC_INACTIVE state, in accordance with various embodiments.

FIG. 4 illustrates an example procedure to support positioning in RRC_INACTIVE, in accordance with various embodiments. Aspects of the procedure of FIG. 4 are described further below.

1. The UE reports its LPHAP requirement via registration procedure, or capability reporting, or based on subscription; And therefore LMF knows whether the UE supports LPHAP or not;

gNB may obtain UE's LPHAP capability based on capability reporting from the UE, or from the LMF in step 7;

2. Steps 1-21 for the deferred 5GC-MT-LR specified in TS 23.273, clause 6.3.1 are performed. The UE is released by the last serving gNB from RRC_CONECTED to RRC_INACTIVE by RRCRelease with SuspendConfig.

3. the LMF selects LPHAP specific resources based on UE's LPHAP capability, e.g.

DL positioning methods:
larger PRS periodicity, and/or
narrow PRS bandwidth, and/or
LPHAP specific cell, and/or
frequency UL positioning methods:
larger periodicity of SRS, and/or
Set of SRS configurations;

4/5. When an event is detected (or slightly before) the UE sends a UL NAS Transport message along with the RRC Resume Request with SDT.

6. The receiving gNB forwards the message to the serving AMF. The AMF determines the corresponding LMF and forwards the message towards the LMF.

NOTE: If the anchor gNB is not changed from the last serving gNB to the receiving gNB, the LCS event report is forwarded form the receiving gNB to the last serving gNB via XnAP message RRC TRANSFER as in TS 38.423. Subsequent downlink/uplink messages are also forwarded between last serving gNB to the receiving gNB via XnAP message RRC TRANSFER.

7-10. The LMF will request the serving gNB to configure UL SRS configuration to the UE, and forward the configuration to measured gNB; In operation 9, the LMF may forward UE's LPHAP capability and recommended LPHAP specific resources to the gNB;

In operation 8, the gNB selects LPHAP specific resources based on UE's LPHAP capability. For example, for UL positioning methods, the resources may be associated with a larger periodicity of SRS and/or a larger periodicity of a paging cycle. For DL positioning methods, the resources may be associated with a larger PRS periodicity and/or a smaller PRS bandwidth.

11. The LMF sends a supplementary services (SS) LCS Event Report Acknowledgement to the UE which is transferred via the serving AMF and the serving gNB. The receiving gNB then provides the SS Event Report Acknowledgement to the UE at Step 11b via Subsequent DL SDT.

12. The receiving gNB sends a RRCRelease message with suspendConfig to keep the UE in RRC_INACTIVE state. The RRCRelease message includes the UL-SRS Configuration.

13a. the UE performs DL PRS measurements if the requested positioning method is DL related;

13b. for UL related positioning methods, the UE transmits UL-SRS and the gNBs that have received the NRPPa message for measurement request perform the measurements of the UL-SRS transmitted by the UE.

14a. For DL related measurements, the UE sends the results to the gNB using SDT, and then the gNB forwards the results to AMF/LMF;

14b. For UL related measurements, after performing the UL-SRS measurements, the gNBs provide the UL measurements to the LMF in a NRPPa Measurement Response message.

Systems and Implementations

Figure 5:
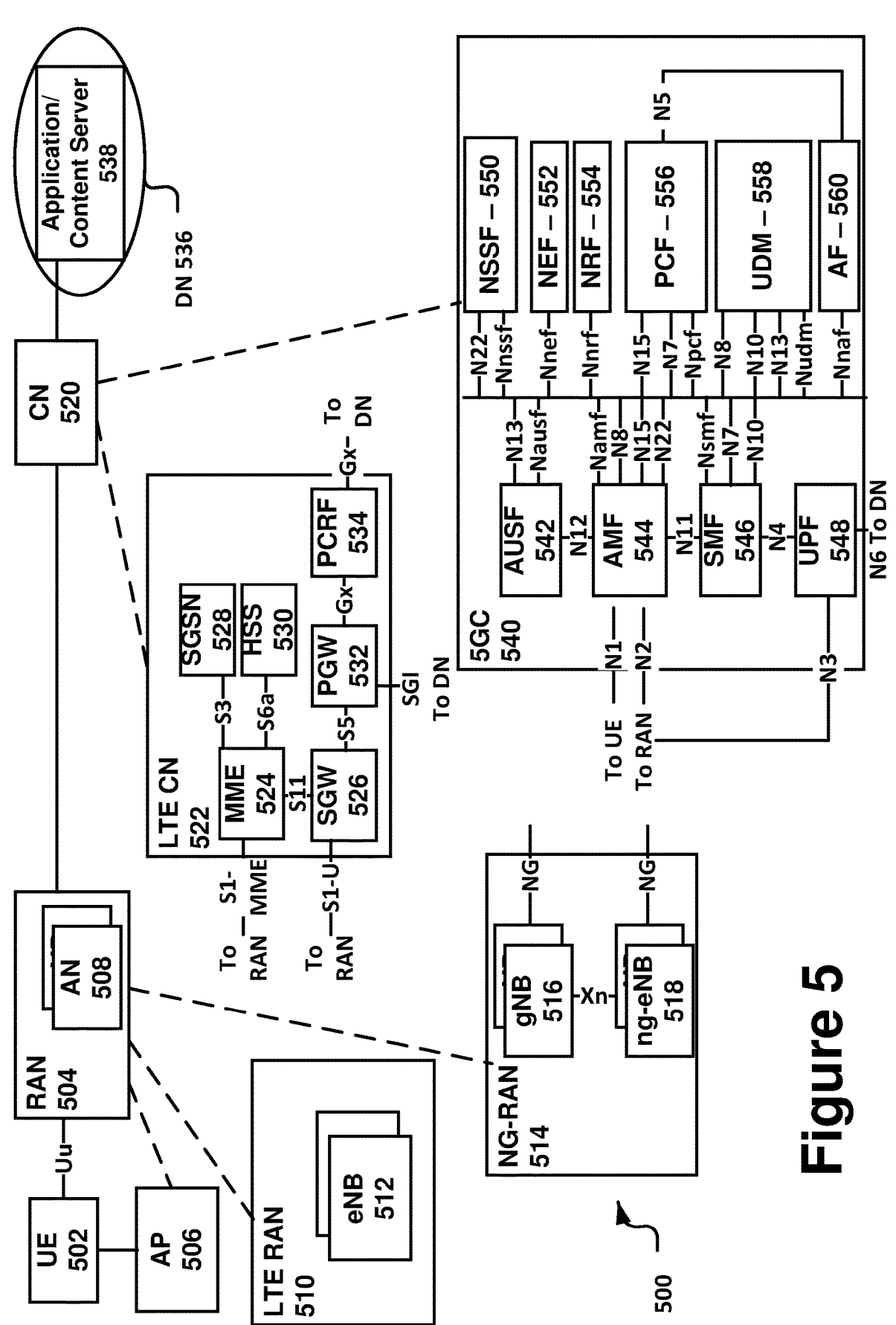
FIG. 5 schematically illustrates a wireless network in accordance with various embodiments.
Figure 6:
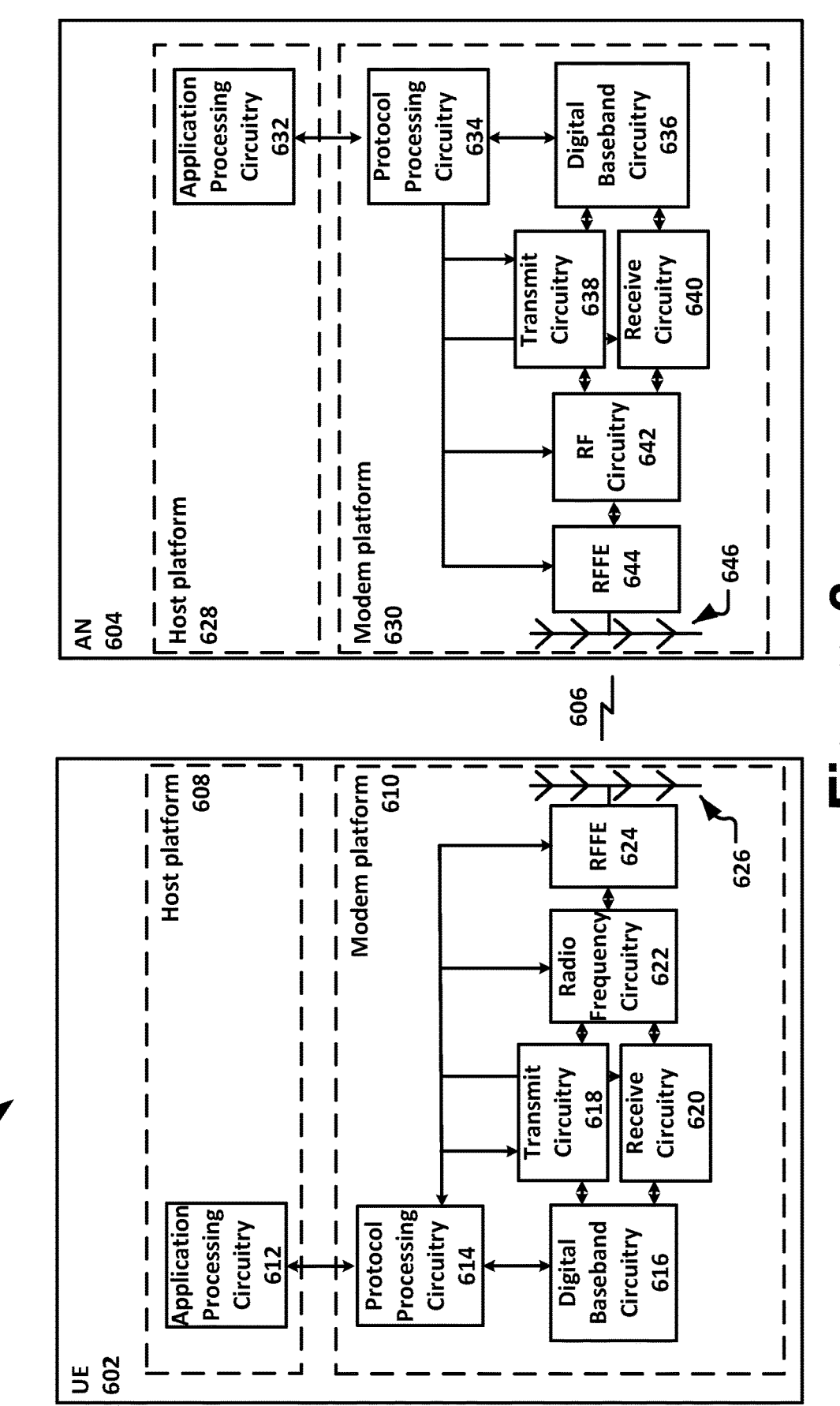
FIG. 6 schematically illustrates components of a wireless network in accordance with various embodiments.
Figure 7:
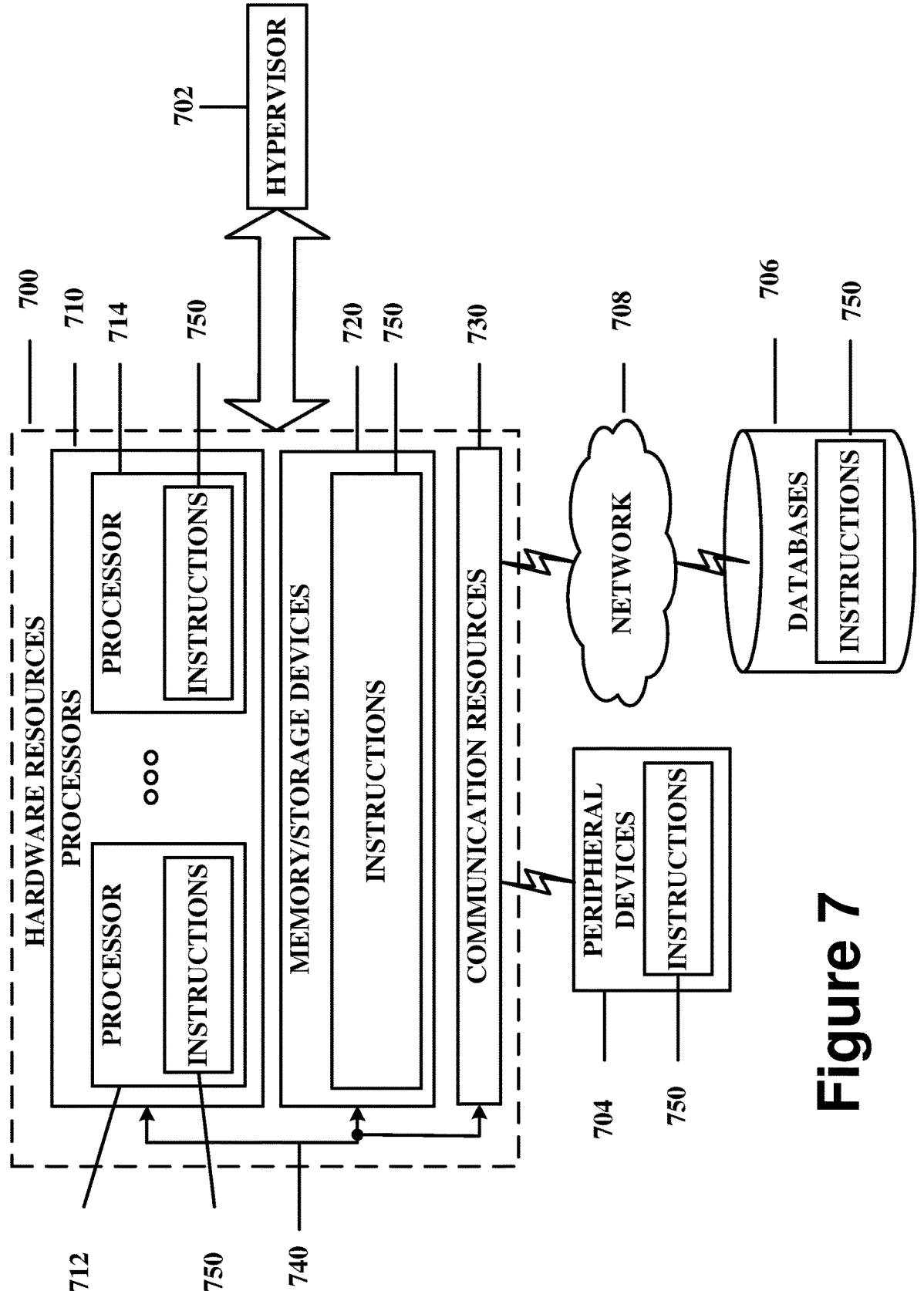
FIG. 7 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 5-7 illustrate various systems, devices, and components that may implement aspects of disclosed embodiments.

FIG. 5 illustrates a network 500 in accordance with various embodiments. The network 500 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 500 may include a UE 502, which may include any mobile or non-mobile computing device designed to communicate with a RAN 504 via an over-the-air connection. The UE 502 may be communicatively coupled with the RAN 504 by a Uu interface. The UE 502 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 500 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 502 may additionally communicate with an AP 506 via an over-the-air connection. The AP 506 may manage a WLAN connection, which may serve to offload some/all network traffic from the RAN 504. The connection between the UE 502 and the AP 506 may be consistent with any IEEE 802.11 protocol, wherein the AP 506 could be a wireless fidelity (Wi-Fi®) router. In some embodiments, the UE 502, RAN 504, and AP 506 may utilize cellular-WLAN aggregation (for example, LWA/LWIP). Cellular-WLAN aggregation may involve the UE 502 being configured by the RAN 504 to utilize both cellular radio resources and WLAN resources.

The RAN 504 may include one or more access nodes, for example, AN 508. AN 508 may terminate air-interface protocols for the UE 502 by providing access stratum protocols including RRC, PDCP, RLC, MAC, and L1 protocols. In this manner, the AN 508 may enable data/voice connectivity between CN 520 and the UE 502. In some embodiments, the AN 508 may be implemented in a discrete device or as one or more software entities running on server computers as part of, for example, a virtual network, which may be referred to as a CRAN or virtual baseband unit pool. The AN 508 be referred to as a BS, gNB, RAN node, eNB, ng-eNB, NodeB, RSU, TRxP, TRP, etc. The AN 508 may be a macrocell base station or a low power base station for providing femtocells, picocells or other like cells having smaller coverage areas, smaller user capacity, or higher bandwidth compared to macrocells.

In embodiments in which the RAN 504 includes a plurality of ANs, they may be coupled with one another via an X2 interface (if the RAN 504 is an LTE RAN) or an Xn interface (if the RAN 504 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 504 may each manage one or more cells, cell groups, component carriers, etc. to provide the UE 502 with an air interface for network access. The UE 502 may be simultaneously connected with a plurality of cells provided by the same or different ANs of the RAN 504. For example, the UE 502 and RAN 504 may use carrier aggregation to allow the UE 502 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 504 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 502 or AN 508 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 504 may be an LTE RAN 510 with eNB s, for example, eNB 512. The LTE RAN 510 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 504 may be an NG-RAN 514 with gNB s, for example, gNB 516, or ng-eNBs, for example, ng-eNB 518. The gNB 516 may connect with 5G-enabled UEs using a 5G NR interface. The gNB 516 may connect with a 5G core through an NG interface, which may include an N2 interface or an N3 interface. The ng-eNB 518 may also connect with the 5G core through an NG interface, but may connect with a UE via an LTE air interface. The gNB 516 and the ng-eNB 518 may connect with each other over an Xn interface.

In some embodiments, the NG interface may be split into two parts, an NG user plane (NG-U) interface, which carries traffic data between the nodes of the NG-RAN 514 and a UPF 548 (e.g., N3 interface), and an NG control plane (NG-C) interface, which is a signaling interface between the nodes of the NG-RAN 514 and an AMF 544 (e.g., N2 interface).

The NG-RAN 514 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 502 can be configured with multiple BWPs where each BWP configuration has a different SCS. When a BWP change is indicated to the UE 502, the SCS of the transmission is changed as well. Another use case example of BWP is related to power saving. In particular, multiple BWPs can be configured for the UE 502 with different amount of frequency resources (for example, PRBs) to support data transmission under different traffic loading scenarios. A BWP containing a smaller number of PRBs can be used for data transmission with small traffic load while allowing power saving at the UE 502 and in some cases at the gNB 516. A BWP containing a larger number of PRBs can be used for scenarios with higher traffic load.

The RAN 504 is communicatively coupled to CN 520 that includes network elements to provide various functions to support data and telecommunications services to customers/ subscribers (for example, users of UE 502). The components of the CN 520 may be implemented in one physical node or separate physical nodes. In some embodiments, NFV may be utilized to virtualize any or all of the functions provided by the network elements of the CN 520 onto physical compute/storage resources in servers, switches, etc. A logical instantiation of the CN 520 may be referred to as a network slice, and a logical instantiation of a portion of the CN 520 may be referred to as a network sub-slice.

In some embodiments, the CN 520 may be an LTE CN 522, which may also be referred to as an EPC. The LTE CN 522 may include MME 524, SGW 526, SGSN 528, HSS 530, PGW 532, and PCRF 534 coupled with one another over interfaces (or "reference points") as shown. Functions of the elements of the LTE CN 522 may be briefly introduced as follows.

The MME 524 may implement mobility management functions to track a current location of the UE 502 to facilitate paging, bearer activation/deactivation, handovers, gateway selection, authentication, etc.

The SGW 526 may terminate an S1 interface toward RAN and route data packets between the RAN and the LTE CN 522. The SGW 526 may be a local mobility anchor point for inter-RAN node handovers and also may provide an anchor for inter-3GPP mobility. Other responsibilities may include lawful intercept, charging, and some policy enforcement.

The SGSN 528 may track a location of the UE 502 and perform security functions and access control. In addition, the SGSN 528 may perform inter-EPC node signaling for mobility between different RAT networks; PDN and S-GW selection as specified by MME 524; MME selection for handovers; etc. The S3 reference point between the MME 524 and the SGSN 528 may enable user and bearer information exchange for inter-3GPP access network mobility in idle/active states.

The HSS 530 may include a database for network users, including subscription-related information to support the network entities' handling of communication sessions. The HSS 530 can provide support for routing/roaming, authentication, authorization, naming/addressing resolution, location dependencies, etc. An S6a reference point between the HSS 530 and the MME 524 may enable transfer of subscription and authentication data for authenticating/authorizing user access to the LTE CN 520.

The PGW 532 may terminate an SGi interface toward a data network (DN) 536 that may include an application/ content server 538. The PGW 532 may route data packets between the LTE CN 522 and the data network 536. The PGW 532 may be coupled with the SGW 526 by an S5 reference point to facilitate user plane tunneling and tunnel management. The PGW 532 may further include a node for policy enforcement and charging data collection (for example, PCEF). Additionally, the SGi reference point between the PGW 532 and the data network 536 may be an operator external public, a private PDN, or an intra-operator packet data network, for example, for provision of IMS services. The PGW 532 may be coupled with a PCRF 534 via a Gx reference point.

The PCRF 534 is the policy and charging control element of the LTE CN 522. The PCRF 534 may be communicatively coupled to the app/content server 538 to determine appropriate QoS and charging parameters for service flows. The PCRF 532 may provision associated rules into a PCEF (via Gx reference point) with appropriate TFT and QCI.

In some embodiments, the CN 520 may be a 5GC 540. The 5GC 540 may include an AUSF 542, AMF 544, SMF 546, UPF 548, NSSF 550, NEF 552, NRF 554, PCF 556, UDM 558, and AF 560 coupled with one another over interfaces (or "reference points") as shown. Functions of the elements of the 5GC 540 may be briefly introduced as follows.

The AUSF 542 may store data for authentication of UE 502 and handle authentication-related functionality. The AUSF 542 may facilitate a common authentication framework for various access types. In addition to communicating with other elements of the 5GC 540 over reference points as shown, the AUSF 542 may exhibit an Nausf service-based interface.

The AMF 544 may allow other functions of the 5GC 540 to communicate with the UE 502 and the RAN 504 and to subscribe to notifications about mobility events with respect to the UE 502. The AMF 544 may be responsible for registration management (for example, for registering UE 502), connection management, reachability management, mobility management, lawful interception of AMF-related events, and access authentication and authorization. The AMF 544 may provide transport for SM messages between the UE 502 and the SMF 546, and act as a transparent proxy for routing SM messages. AMF 544 may also provide transport for SMS messages between UE 502 and an SMSF. AMF 544 may interact with the AUSF 542 and the UE 502 to perform various security anchor and context management functions. Furthermore, AMF 544 may be a termination point of a RAN CP interface, which may include or be an N2 reference point between the RAN 504 and the AMF 544; and the AMF 544 may be a termination point of NAS (N1) signaling, and perform NAS ciphering and integrity protection. AMF 544 may also support NAS signaling with the UE 502 over an N3 IWF interface.

The SMF 546 may be responsible for SM (for example, session establishment, tunnel management between UPF 548 and AN 508); UE IP address allocation and management (including optional authorization); selection and control of UP function; configuring traffic steering at UPF 548 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 544 over N2 to AN 508; and determining SSC mode of a session. SM may refer to management of a PDU session, and a PDU session or "session" may refer to a PDU connectivity service that provides or enables the exchange of PDUs between the UE 502 and the data network 536.

The UPF 548 may act as an anchor point for intra-RAT and inter-RAT mobility, an external PDU session point of interconnect to data network 536, and a branching point to support multi-homed PDU session. The UPF 548 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 548 may include an uplink classifier to support routing traffic flows to a data network.

The NSSF 550 may select a set of network slice instances serving the UE 502. The NSSF 550 may also determine allowed NSSAI and the mapping to the subscribed S-NS-SAIs, if needed. The NSSF 550 may also determine the AMF set to be used to serve the UE 502, or a list of candidate AMFs based on a suitable configuration and possibly by querying the NRF 554. The selection of a set of network slice instances for the UE 502 may be triggered by the AMF 544 with which the UE 502 is registered by interacting with the NSSF 550, which may lead to a change of AMF. The NSSF 550 may interact with the AMF 544 via an N22 reference point; and may communicate with another NSSF in a visited network via an N31 reference point (not shown). Additionally, the NSSF 550 may exhibit an Nnssf service-based interface.

The NEF 552 may securely expose services and capabilities provided by 3GPP network functions for third party, internal exposure/re-exposure, AFs (e.g., AF 560), edge computing or fog computing systems, etc. In such embodiments, the NEF 552 may authenticate, authorize, or throttle the AFs. NEF 552 may also translate information exchanged with the AF 560 and information exchanged with internal network functions. For example, the NEF 552 may translate between an AF-Service-Identifier and an internal 5GC information. NEF 552 may also receive information from other NFs based on exposed capabilities of other NFs. This information may be stored at the NEF 552 as structured data, or at a data storage NF using standardized interfaces. The stored information can then be re-exposed by the NEF 552 to other NFs and AFs, or used for other purposes such as analytics. Additionally, the NEF 552 may exhibit an Nnef service-based interface.

The NRF 554 may support service discovery functions, receive NF discovery requests from NF instances, and provide the information of the discovered NF instances to the NF instances. NRF 554 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 554 may exhibit the Nnrf service-based interface.

The PCF 556 may provide policy rules to control plane functions to enforce them, and may also support unified policy framework to govern network behavior. The PCF 556 may also implement a front end to access subscription information relevant for policy decisions in a UDR of the UDM 558. In addition to communicating with functions over reference points as shown, the PCF 556 exhibit an Npcf service-based interface.

The UDM 558 may handle subscription-related information to support the network entities' handling of communication sessions, and may store subscription data of UE 502. For example, subscription data may be communicated via an N8 reference point between the UDM 558 and the AMF 544. The UDM 558 may include two parts, an application front end and a UDR. The UDR may store subscription data and policy data for the UDM 558 and the PCF 556, and/or structured data for exposure and application data (including PFDs for application detection, application request information for multiple UEs 502) for the NEF 552. The Nudr service-based interface may be exhibited by the UDR 221 to allow the UDM 558, PCF 556, and NEF 552 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 558 may exhibit the Nudm service-based interface.

The AF 560 may provide application influence on traffic routing, provide access to NEF, and interact with the policy framework for policy control.

In some embodiments, the 5GC 540 may enable edge computing by selecting operator/3rd party services to be geographically close to a point that the UE 502 is attached to the network. This may reduce latency and load on the network. To provide edge-computing implementations, the 5GC 540 may select a UPF 548 close to the UE 502 and execute traffic steering from the UPF 548 to data network 536 via the N6 interface. This may be based on the UE subscription data, UE location, and information provided by the AF 560. In this way, the AF 560 may influence UPF (re)selection and traffic routing. Based on operator deployment, when AF 560 is considered to be a trusted entity, the network operator may permit AF 560 to interact directly with relevant NFs. Additionally, the AF 560 may exhibit an Naf service-based interface.

The data network 536 may represent various network operator services, Internet access, or third party services that may be provided by one or more servers including, for example, application/content server 538.

FIG. 6 schematically illustrates a wireless network 600 in accordance with various embodiments. The wireless network 600 may include a UE 602 in wireless communication with an AN 604. The UE 602 and AN 604 may be similar to, and substantially interchangeable with, like-named components described elsewhere herein.

The UE 602 may be communicatively coupled with the AN 604 via connection 606. The connection 606 is illustrated as an air interface to enable communicative coupling, and can be consistent with cellular communications protocols such as an LTE protocol or a 5G NR protocol operating at mmWave or sub-6 GHz frequencies.

The UE 602 may include a host platform 608 coupled with a modem platform 610. The host platform 608 may include application processing circuitry 612, which may be coupled with protocol processing circuitry 614 of the modem platform 610. The application processing circuitry 612 may run various applications for the UE 602 that source/sink application data. The application processing circuitry 612 may further implement one or more layer operations to transmit/receive application data to/from a data network. These layer operations may include transport (for example UDP) and Internet (for example, IP) operations The protocol processing circuitry 614 may implement one or more of layer operations to facilitate transmission or reception of data over the connection 606. The layer operations implemented by the protocol processing circuitry 614 may include, for example, MAC, RLC, PDCP, RRC and NAS operations.

The modem platform 610 may further include digital baseband circuitry 616 that may implement one or more layer operations that are "below" layer operations performed by the protocol processing circuitry 614 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 610 may further include transmit circuitry 618, receive circuitry 620, RF circuitry 622, and RF front end (RFFE) 624, which may include or connect to one or more antenna panels 626. Briefly, the transmit circuitry 618 may include a digital-to-analog converter, mixer, intermediate frequency (IF) components, etc.; the receive circuitry 620 may include an analog-to-digital converter, mixer, IF components, etc.; the RF circuitry 622 may include a low-noise amplifier, a power amplifier, power tracking components, etc.; RFFE 624 may include filters (for example, surface/bulk acoustic wave filters), switches, antenna tuners, beamforming components (for example, phase-array antenna components), etc. The selection and arrangement of the components of the transmit circuitry 618, receive circuitry 620, RF circuitry 622, RFFE 624, and antenna panels 626 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 614 may include one or more instances of control circuitry (not shown) to provide control functions for the transmit/receive components.

A UE reception may be established by and via the antenna panels 626, RFFE 624, RF circuitry 622, receive circuitry 620, digital baseband circuitry 616, and protocol processing circuitry 614. In some embodiments, the antenna panels 626 may receive a transmission from the AN 604 by receive-beamforming signals received by a plurality of antennas/antenna elements of the one or more antenna panels 626.

A UE transmission may be established by and via the protocol processing circuitry 614, digital baseband circuitry 616, transmit circuitry 618, RF circuitry 622, RFFE 624, and antenna panels 626. In some embodiments, the transmit components of the UE 604 may apply a spatial filter to the data to be transmitted to form a transmit beam emitted by the antenna elements of the antenna panels 626.

Similar to the UE 602, the AN 604 may include a host platform 628 coupled with a modem platform 630. The host platform 628 may include application processing circuitry 632 coupled with protocol processing circuitry 634 of the modem platform 630. The modem platform may further include digital baseband circuitry 636, transmit circuitry 638, receive circuitry 640, RF circuitry 642, RFFE circuitry 644, and antenna panels 646. The components of the AN 604 may be similar to and substantially interchangeable with like-named components of the UE 602. In addition to performing data transmission/reception as described above, the components of the AN 608 may perform various logical functions that include, for example, RNC functions such as radio bearer management, uplink and downlink dynamic radio resource management, and data packet scheduling.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740 or other interface circuitry. For embodiments where node virtualization (e.g., NFV) is utilized, a hypervisor 702 may be executed to provide an execution environment for one or more network slices/sub-slices to utilize the hardware resources 700.

The processors 710 may include, for example, a processor 712 and a processor 714. The processors 710 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 720 may include main memory, disk storage, or any suitable combination thereof. The memory/storage devices 720 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 730 may include interconnection or network interface controllers, components, or other suitable devices to communicate with one or more peripheral devices 704 or one or more databases 706 or other network elements via a network 708. For example, the communication resources 730 may include wired communication components (e.g., for coupling via USB, Ethernet, etc.), cellular communication components, NFC components, Bluetooth® (or Bluetooth® Low Energy) components, Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Example Procedures

Figure 8:
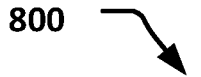
FIG. 8 illustrates an example procedure to practice various embodiments herein.

In some embodiments, the electronic device(s), network(s), system(s), chip(s) or component(s), or portions or implementations thereof, of FIGS. 5-7, or some other figure herein, may be configured to perform one or more processes, techniques, or methods as described herein, or portions thereof. One such process 800 is depicted in FIG. 8. The process may be performed by a UE or a portion thereof. At 802, the process 800 may include sending, to a network entity, an indication of the LPHAP requirement or capability. At 804, the process 800 may further include performing a positioning procedure in accordance with the LPHAP requirement or capability while the UE is in an RRC_IDLE state or an RRC_INACTIVE state. At 806, the process 800 may further include reporting a result of the positioning procedure.

Figure 9:
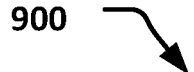
FIG. 9 illustrates another example procedure to practice various embodiments herein.

FIG. 9 illustrates another example process 900 in accordance with various embodiments. The process 900 may be performed by a network entity, such as a gNB, LMF, and/or AMF, or a portion thereof. At 902, the process 900 may include receiving an indication of a low power high accuracy positioning (LPHAP) requirement or capability of a UE. At 904, the process 900 may further include configuring, based on the indication, resources for the UE to use for a positioning procedure when the UE is in an RRC_IDLE state or an RRC_INACTIVE state.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Some non-limiting examples of various embodiments are provided below.

Example A1 may include an apparatus to be implemented in a user equipment (UE), the apparatus comprising: a memory to store a low power high accuracy positioning (LPHAP) requirement or capability of the UE; and processor circuitry coupled to the memory, the processor circuitry to: send, to a network entity, an indication of the LPHAP requirement or capability; perform a positioning procedure in accordance with the LPHAP requirement or capability while the UE is in an RRC_IDLE state or an RRC_INACTIVE state; and report a result of the positioning procedure.

Example A2 may include the apparatus of example A1, wherein the processor circuitry is further to receive a message to trigger the positioning procedure, wherein the message includes at least one of: a required positioning method; corresponding downlink or uplink resources; or a positioning ID associated with the positioning procedure.

Example A3 may include the apparatus of example A2, wherein the message is a paging message or a mobile terminated (MT)-small data transmission (SDT).

Example A4 may include the apparatus of example A1, wherein the indication is sent via a registration procedure, a capability reporting, or via a subscription.

Example A5 may include the apparatus of example A1, wherein to perform the positioning procedure includes to: identify downlink resources or uplink resources in accordance with the LPHAP requirement or capability; and perform a measurement on a positioning reference signal (PRS) in the downlink resources or transmit a sounding reference signal (SRS) in the uplink resources.

Example A6 may include the apparatus of example A1, wherein the positioning procedure is performed while the UE is in the RRC_IDLE state, and wherein the processor circuitry is to transition the UE to a RRC_CONNECTED state to report the result.

Example A7 may include the apparatus of example A1, wherein the processor circuitry is to report the result while the UE is in the RRC_IDLE state or the RRC_INACTIVE state.

Example A8 may include the apparatus of example A1, wherein the network entity is a next generation Node B (gNB), an access and mobility management function (AMF), or a location management function (LMF).

Example A9 may include one or more non-transitory computer-readable media (NTCRM) having instructions, stored thereon, that when executed by one or more processors configure a network entity to: receive an indication of a low power high accuracy positioning (LPHAP) requirement or capability of a UE; and configure, based on the indication, resources for the UE to use for a positioning procedure when the UE is in an RRC_IDLE state or an RRC_INACTIVE state.

Example A10 may include the one or more NTCRM of example A9, wherein the indication is received via radio resource control (RRC) signaling, a registration procedure, Long Term Evolution positioning protocol (LPP) signaling, or a subscription.

Example A11 may include the one or more NTCRM of example A10, wherein the instructions, when executed, further configure the network entity to trigger the positioning procedure via a page or a mobile terminated (MT)-small data transmission (SDT).

Example A12 may include the one or more NTCRM of example A11, wherein the page or the MT-SDT indicates a required positioning method for the positioning procedure.

Example A13 may include the one or more NTCRM of example A11, wherein the page or the MT-SDT indicates the configured resources.

Example A14 may include the one or more NTCRM of example A11, wherein the page or the MT-SDT indicates a positioning ID that corresponds to a session of the positioning procedure.

Example A15 may include the one or more NTCRM of example A9, wherein the configured resources are uplink resources for a sounding reference signal, and wherein the configured resources are determined based on a larger periodicity of the SRS or a larger periodicity for a paging cycle compared with another UE that does not use LPHAP.

Example A16 may include the one or more NTCRM of example A9, wherein the configured resources are downlink resources for a positioning reference signal (PRS), and wherein the configured resources are determined based on a larger periodicity of the PRS or a narrower bandwidth of the PRS compared with another UE that does not use LPHAP.

Example A17 may include the one or more NTCRM of example A9, wherein the network entity is a next generation Node B (gNB), an access and mobility management function (AMF), or a location management function (LMF).

Example B1 may include the method for positioning in RRC_IDLE, where the AMF, LMF and/or gNB obtain the UE's LPHAP capability, and based on UE's LPHAP capability performs positioning in RRC_IDLE.

Example B2 may include the method of example B1 or some other example herein, whereby the UE reports LPHAP capability via RRC signalling, NAS registration procedure, LPP signalling or subscription.

Example B3 may include the method of example B1 or some other example herein, whereby the AMF/LMF maintain UE context when the UE is performing positioning in RRC_IDLE.

Example B4 may include the method of example B1 or some other example herein, whereby the AMF/LMF triggers positioning procedure using paging or MT-SDT. The message could indicate the required positioning methods, and/or corresponding resources (DL/UL), and/or corresponding resources (DL/UL) group ID, Example B5 may include the method of example B1 or some other example herein, whereby the AMF/LMF provides positioning ID to identify the session (UE, LMF and AMF) in the whole procedure.

Example B6 may include the method of example B3 or some other example herein, whereby the UE in RRC_IDLE based on the resources requested by the AMF/LMF in claim 3:

The network may provide multiple groups of assistance data together with assistance data group ID via broadcast signalling or dedicated signalling.

For DL, the UE obtains assistance data or multiple assistance data groups from broadcast signalling or preconfigured via dedicated signalling. The LMF/AMF may indicate the selected assistance data group ID in paging, and the UE shall use the assistance data group indicated by the network if available for the positioning procedure, otherwise the UE selects the proper one.

For UL, the UE obtains the UL reference signal configuration or multiple UL reference signal configuration groups via broadcast signalling or dedicated signalling. The LMF/AMF may indicate the selected assistance data group ID in paging, and the UE shall use the assistance data group indicated by the network if available for the positioning procedure, otherwise the UE selects the proper one.

Example B7 may include the method of example B3 or some other example herein, whereby the UE reports the result without the state transition by transmitting the message via small data transmission (SDT), e.g., RACH or any UL transmission; The message includes the allocated positioning ID Example B8 may include the method of example B4 or some other example herein, whereby the RAN selects corresponding AMF based on the positioning ID indicated by the UE;

Example B9 may include the method of example B5 or some other example herein, whereby the AMF finds the corresponding LMF based on the positioning ID and forwards results to the LMF together with positioning ID;

Example B10 may include the method for positioning in RRC_INACTIVE, where the AMF, LMF and/or gNB obtain the UE's LPHAP capability, and based on UE's LPHAP capability performs positioning in RRC_INACTIVE and selects LPHAP specific configuration; Example B11 may include the method of example B10 or some other example herein, whereby the UE reports LPHAP capability via RRC signalling, NAS registration procedure, LPP signalling or subscription.

Example B12 may include the method of example B11 or some other example herein, whereby the gNB obtains UE's LPHAP capability from the LMF via NRPPa signalling and/or from the UE via RRC signalling.

Example B13 may include the method of example B11 or some other example herein, whereby the LMF obtains UE's LPHAP capability via LPP signalling, and/or from the AMF.

Example B14 may include the method of example B11 or some other example herein, whereby the AMF obtains UE's LPHAP capability from gNB or via NAS signalling or subscription information.

Example B15 may include the method of example B10 or some other example herein, whereby the LPHAP specific resources consist of any combination of following configurations:

DL positioning methods:

larger PRS periodicity, and/or narrow PRS bandwidth, and/or

LPHAP specific cell, and/or frequency

UL positioning methods:

larger periodicity of SRS, and/or larger periodicity for paging cycle, and/or larger periodicity for DRX cycle, and/or Set of SRS configurations.

Example B16 may include the method of example B15 or some other example herein, whereby the gNB obtains recommended LPHAP specific resources from the LMF.

Example B17 may include a method comprising: receiving an indication of a low power high accuracy positioning (LPHAP) capability of a UE; and performing, based on the indication, a positioning procedure associated with the UE when the UE is in an RRC_IDLE state or an RRC_INACTIVE state.

Example B18 may include the method of example B17 or some other example herein, wherein the indication is received via RRC signalling, a NAS registration procedure, LPP signalling, and/or a subscription.

Example B19 may include the method of example B17-B18 or some other example herein, further comprising maintaining UE context information of the UE during the positioning procedure.

Example B20 may include the method of example B17-B19 or some other example herein, further comprising triggering the positioning procedure via a page or a mobile terminated small data transmission (MT-SDT).

Example B21 may include the method of example B20 or some other example herein, wherein the page or the MT-SDT indicates:

a required positioning method, corresponding resources (DL/UL), and/or a group ID of corresponding resources (DL/UL), Example B22 may include the method of example B17-B21 or some other example herein, further comprising sending a positioning ID to the UE, wherein the positioning ID corresponds to a session of the positioning procedure.

Example B23 may include the method of example B17-B22 or some other example herein, wherein the method is performed by an AMF, a LMF, or a portion thereof.

Example Z01 may include an apparatus comprising means to perform one or more elements of a method described in or related to any of examples A1-A17, B1-B23, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A17, B1-B23, or any other method or process described herein.

Example Z03 may include an apparatus comprising logic, modules, or circuitry to perform one or more elements of a method described in or related to any of examples A1-A17, B1-B23, or any other method or process described herein.

Example Z04 may include a method, technique, or process as described in or related to any of examples A1-A17, B1-B23, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A17, B1-B23, or portions thereof.

Example Z06 may include a signal as described in or related to any of examples A1-A17, B1-B23, or portions or parts thereof.

Example Z07 may include a datagram, packet, frame, segment, protocol data unit (PDU), or message as described in or related to any of examples A1-A17, B1-B23, or portions or parts thereof, or otherwise described in the present disclosure.

Example Z08 may include a signal encoded with data as described in or related to any of examples A1-A17, B1-B23, or portions or parts thereof, or otherwise described in the present disclosure.

Example Z09 may include a signal encoded with a datagram, packet, frame, segment, protocol data unit (PDU), or message as described in or related to any of examples A1-A17, B1-B23, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A17, B1-B23, or portions thereof.

Example Z11 may include a computer program comprising instructions, wherein execution of the program by a processing element is to cause the processing element to carry out the method, techniques, or process as described in or related to any of examples A1-A17, B1-B23, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |

-continued

| | |
|---|---|
| CRB | Common Resource Block |
| CRC | Cyclic Redundancy Check |
| CRI | Channel-State Information |
| | Resource Indicator, |
| | CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, |
| | Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management |
| | Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. |
| | Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel |
| | assessment, extended CCA |
| ECCE | Enhanced Control Channel |
| | Element, Enhanced CCE |
| ED | Energy Detection |
| EDGE | Enhanced Datarates for GSM |
| | Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management |
| | Function |
| EGPRS | Enhanced GPRS |
| EIR | Equipment Identity Register |
| eLAA | enhanced Licensed Assissted, |
| | Access, enhanced LAA |
| EM | Element Manager |
| eMBB | Enhanced Mobile Broadband |
| EMS | Element Management System |
| eNB | evolved NodeB, E-UTRAN |
| | Node B |
| EN-DC | E-UTRA-NR Dual Connectivity |
| EPC | Evolved Packet Core |
| EPDCCH | enhanced PDCCH, enhanced |
| | Physical Downlink Control Cannel |
| EPRE | Energy per resource element |
| EPS | Evolved Packet System |

-continued

| | |
|---|---|
| EREG | enhanced REG, enhanced resource |
| | element groups |
| ETSI | European Telecommunications Standards Institute |
| ETWS | Earthquake and Tsunami Warning System |
| eUICC | embedded UICC, embedded |
| | Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted |
| | Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE |
| | Radio Access Network |
| GGSN | Gateway GPRS Support Node |
| GLONASS | GLObal'naya NAvigatsionnaya |
| | Sputnikovaya Sistema (Engl .: |
| | Global Navigation Satellite System) |
| gNB | Next Generation NodeB |
| gNB-CU | gNB-centralized unit, Next |
| | Generation NodeB centralized unit |
| gNB-DU | gNB-distributed unit, Next |
| | Generation NodeB distributed unit |
| GNSS | Global Navigation Satellite System |
| GPRS | General Packet Radio Service |
| GPSI | Generic Public Subscription Identifier |
| GSM | Global System for Mobile |
| | Communications, Groupe Spécial Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure |
| | (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |

| | |
|---|---|
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG TWG3 context) |
| MAC-IMAC | used for data integrity of signalling messages (TSGT WG3 context) |
| MANO | Management and Orchestration |
| MBMS | Multimedia Broadcast and Multicast Service |
| MBSFN | Multimedia Broadcast multicast service |

| | |
|---|---|
| | Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RANE-UTRA-NR Dual Connectivity |
| NM | Network Manager |
| NMS | Network Management System |
| N-Pop | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Netwrok Slice Selection Function |

| | |
|---|---|
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFMD | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Radio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSFCH | physical sidelink feedback channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, Qos Flow Identifier |
| Qos | Quality of Service |
| QPSK | Quadrature (Quaternary) Phase Shift Keying |
| QZSS | Quasi-Zenith Satelllite System |
| RA-RNTI | Random Access RNTI |
| RAB | Radio Access Bearer, Random Access Burst |
| RACH | Random Access Channel |
| RADIUS | Remote Authentification Dial In User Service |
| RAN | Radio Access Network |
| RAND | RANDom number (used for authentification) |
| RAR | Random Access Response |

| | |
|---|---|
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Statiion Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |

-continued

| | |
|---|---|
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH Block | SSBRI SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |

-continued

| | |
|---|---|
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | exclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. An apparatus to be implemented in a user equipment (UE), the apparatus comprising:

a memory to store a low power high accuracy positioning (LPHAP) requirement or capability of the UE; and processor circuitry coupled to the memory, the processor circuitry to:

send, to a network entity, an indication of the LPHAP requirement or capability;

perform a positioning procedure based on the LPHAP requirement or capability while the UE is in an RRC_IDLE state or an RRC_INACTIVE state, wherein performing the positioning procedure includes identifying a positioning ID that corresponds to a session of the positioning procedure to identify a positioning context for the UE; and report a result of the positioning procedure including the positioning ID.

2. The apparatus of claim 1, wherein the processor circuitry is further to receive a message to trigger the positioning procedure, wherein the message includes at least one of:

a required positioning method;

corresponding downlink or uplink resources; or a positioning ID associated with the positioning procedure.

3. The apparatus of claim 2, wherein the message is a paging message or a mobile terminated (MT)-small data transmission (SDT).

4. The apparatus of claim 1, wherein the indication is sent via a registration procedure, a capability reporting, or via a subscription.

5. The apparatus of claim 1, wherein to perform the positioning procedure includes to:

identify downlink resources or uplink resources in accordance with the LPHAP requirement or capability; and perform a measurement on a positioning reference signal (PRS) in the downlink resources or transmit a sounding reference signal (SRS) in the uplink resources.

6. The apparatus of claim 1, wherein the positioning procedure is performed while the UE is in the RRC_IDLE state, and wherein the processor circuitry is to transition the UE to a RRC_CONNECTED state to report the result.

7. The apparatus of claim 1, wherein the processor circuitry is to report the result while the UE is in the RRC_IDLE state or the RRC_INACTIVE state.

8. The apparatus of claim 1, wherein the network entity is a next generation Node B (gNB), an access and mobility management function (AMF), or a location management function (LMF).

9. One or more non-transitory computer-readable media (NTCRM) having instructions, stored thereon, that when executed by one or more processors configure a network entity to:

receive an indication of a low power high accuracy positioning (LPHAP) requirement or capability of a UE; and configure, based on the indication, resources for the UE to use for a positioning procedure when the UE is in an RRC_IDLE state or an RRC_INACTIVE state, wherein configuring the resources includes assigning a positioning ID to the UE that corresponds to a session of the positioning procedure to maintain a UE context for the UE while the UE is in the RRC_IDLE state.

10. The one or more NTCRM of claim 9, wherein the indication is received via radio resource control (RRC) signaling, a registration procedure, Long Term Evolution positioning protocol (LPP) signaling, or a subscription.

11. The one or more NTCRM of claim 10, wherein the instructions, when executed, further configure the network entity to trigger the positioning procedure via a page or a mobile terminated (MT)-small data transmission (SDT).

12. The one or more NTCRM of claim 11, wherein the page or the MT-SDT indicates a required positioning method for the positioning procedure.

13. The one or more NTCRM of claim 11, wherein the page or the MT-SDT indicates the configured resources.

14. The one or more NTCRM of claim 11, wherein the page or the MT-SDT indicates a positioning ID that corresponds to a session of the positioning procedure.

15. The one or more NTCRM of claim 9, wherein the configured resources are uplink resources for a sounding reference signal, and wherein the configured resources are determined based on a larger periodicity of the SRS or a larger periodicity for a paging cycle compared with another UE that does not use LPHAP.

16. The one or more NTCRM of claim 9, wherein the configured resources are downlink resources for a positioning reference signal (PRS), and wherein the configured resources are determined based on a larger periodicity of the PRS or a narrower bandwidth of the PRS compared with another UE that does not use LPHAP.

17. The one or more NTCRM of claim 9, wherein the network entity is a next generation Node B (gNB), an access and mobility management function (AMF), or a location management function (LMF).

\* \* \* \* \*